(12) United States Patent
Moore, Jr. et al.

(10) Patent No.: US 7,837,195 B2
(45) Date of Patent: Nov. 23, 2010

(54) ANGLED PRESSURE ROLL USED WITH VACUUM BELTS

(75) Inventors: Kenneth P. Moore, Jr., Rochester, NY (US); Frank Porter, Penfield, NY (US); Adam D. Ledgerwood, Geneva, NY (US); Aaron M. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/361,875

(22) Filed: Jan. 29, 2009

(65) Prior Publication Data

US 2010/0187755 A1 Jul. 29, 2010

(51) Int. Cl.
B65H 29/30 (2006.01)

(52) U.S. Cl. .......................... 271/275; 492/40; 271/276

(58) Field of Classification Search .............. 271/275, 271/276; 492/40, 49, 39
See application file for complete search history.

(56) References Cited

U.S. PATENT DOCUMENTS

| 4,221,480 | A | 9/1980 | Spehrley, Jr. |
| 4,589,651 | A | 5/1986 | Silverberg |
| 5,548,388 | A | 8/1996 | Schieck |
| 6,575,459 | B1 * | 6/2003 | Kakiwaki et al. ........... 271/242 |
| 7,151,905 | B2 | 12/2006 | Fiore et al. |
| 7,594,654 | B2 * | 9/2009 | Matsumoto ................ 271/193 |
| 2008/0061499 | A1 * | 3/2008 | DeGruchy et al. .......... 271/273 |

* cited by examiner

Primary Examiner—Kaitlin S Joerger
(74) Attorney, Agent, or Firm—Gibb I.P. Law Firm, LLC

(57) ABSTRACT

An apparatus comprises a belt and a pressure roll contacting the belt. The pressure roll comprises at least two roll segments connected to a common axle and contacting the belt. The roll segments are offset from one another along the belt.

20 Claims, 4 Drawing Sheets

ANGLED PRESSURE ROLL USED WITH VACUUM BELTS

BACKGROUND AND SUMMARY

Embodiments herein generally relate to electrostatographic printers and copiers or reproduction machines, and more particularly, concern a pressure role used in conjunction with a vacuum belt.

One exemplary embodiment herein comprises a printing apparatus that can include a printing engine that prints markings on sheets of media. The sheets of media that are printed upon (and/or sheets that are scanned) can be transported using belts, such as vacuum belts that generally include a plurality of vacuum openings which hold the media sheets using vacuum force (suction). Thus, the vacuum belts transport the media sheets relative to the printing engine. Often, it is advantageous to use one or more pressure rolls that contact the vacuum belt. The sheets of media pass between the pressure roll and the vacuum belt. Thus, the pressure roll presses the media against the vacuum belt and flattens out the media sheets on the vacuum belt. Embodiments here use a pressure roll that comprises at least two offset roll segments.

The pressure roll segments are connected to a common axle and each pressure roll segment contacts the vacuum belt. With embodiments herein, the roll segments are offset from one another along the vacuum belt. The vacuum belt moves in a first direction (a sheet path direction) that is parallel to the edge of the vacuum belt. The roll segments contact the vacuum belt at different locations along the first direction.

The roll segments are substantially identical to one another in size and shape. Each of the roll segments comprises a substantially identical center through which the common axle passes. All the centers of the roll segments are positioned the same distance from the vacuum belt; however, the centers of the roll segments are offset from one another along the first direction of the vacuum belt. The common axle passes through the centers of the roll segments. Because the roll segments (and the centers) are offset along the first direction, the axle is non-perpendicular to the first direction. In other words, the axle is positioned angled (at an angle other that 90°) with respect to the linear edge of the vacuum belt.

Each of the roll segments comprises a curved, flattened outer surface contacting the vacuum belt. The curved, flattened outer surfaces of the roll segments intersect the curved, flattened outer surfaces of adjacent roll segments at only two points because the roll segments are offset from one another.

These and other features are described in, or are apparent from, the following detailed description.

BRIEF DESCRIPTION OF THE DRAWINGS

Various exemplary embodiments of systems and methods are described in detail below, with reference to the attached drawing FIGS., in which.

DETAILED DESCRIPTION

As mentioned above, the sheets of media that are printed upon (and/or sheets that are scanned) can be transported using belts, such as vacuum belts that generally include a plurality of vacuum openings which hold the media sheets using vacuum force (suction). A fan and ductwork leading from the vacuum openings are conventionally used to generate the necessary vacuum at the vacuum openings. Thus, the vacuum belts transport the media sheets relative to (in a direction to or from) the printing engine.

Often, it is advantageous to use one or more pressure rolls that contact the vacuum belt. The sheets of media pass between the pressure roll and the vacuum belt. Thus, the pressure roll presses the media sheet against the vacuum belt and flattens out the media sheets on the vacuum belt. Embodiments here use a pressure roll that comprises at least two offset roll segments.

Figure 1:
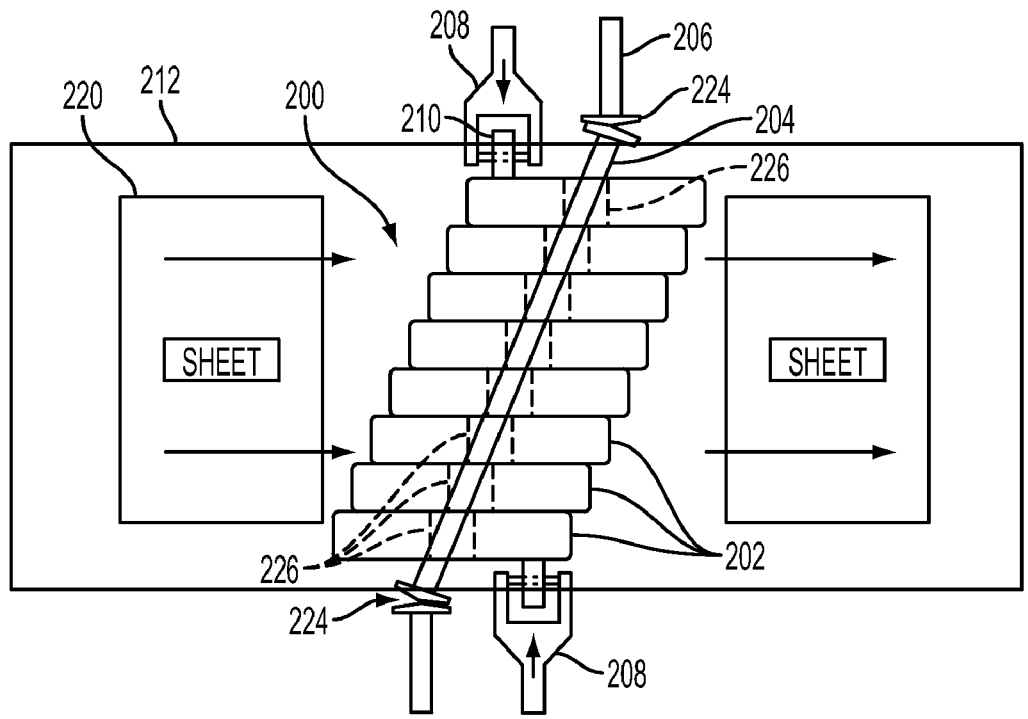
FIG. 1 is a schematic diagram of an apparatus according to embodiments herein.
Figure 2:
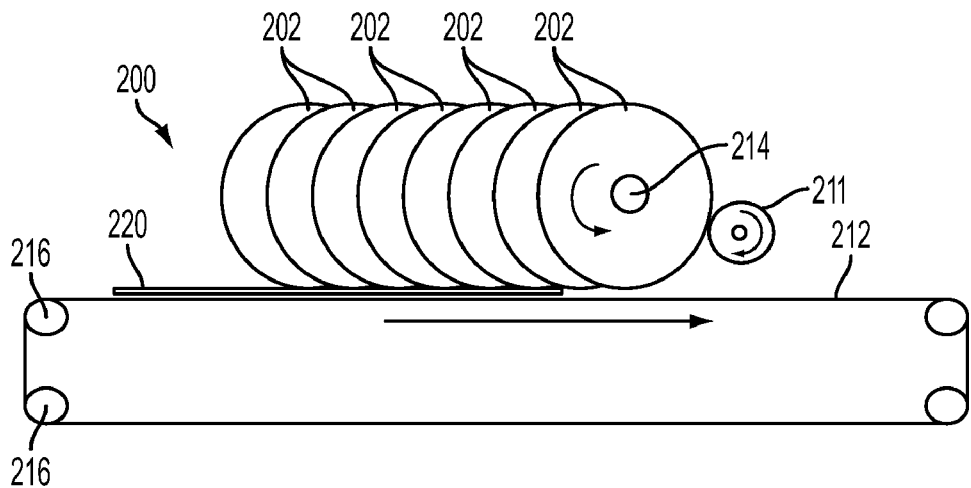
FIG. 2 is a schematic diagram of an apparatus according to embodiments herein.
Figure 3:
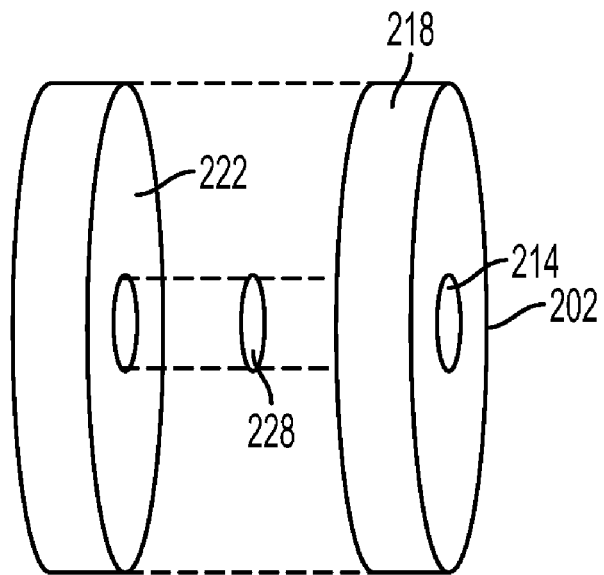
FIG. 3 is a schematic diagram of an apparatus according to embodiments herein.
Figure 4:
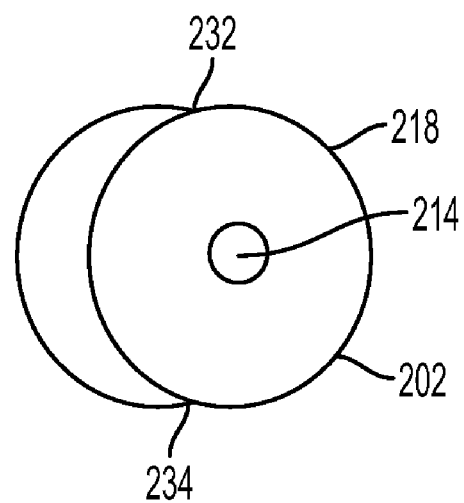
FIG. 4 is a schematic diagram of an apparatus according to embodiments herein.
Figure 5:
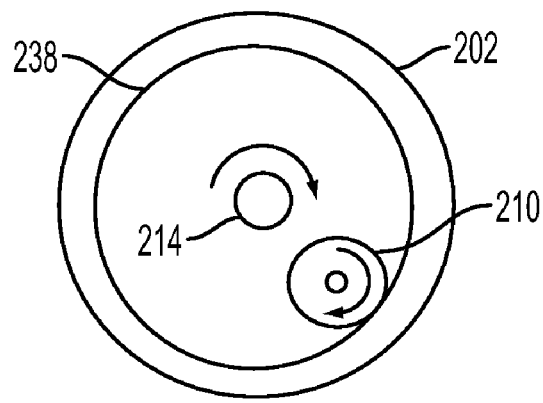
FIG. 5 is a schematic diagram of an apparatus according to embodiments herein.
Figure 6:
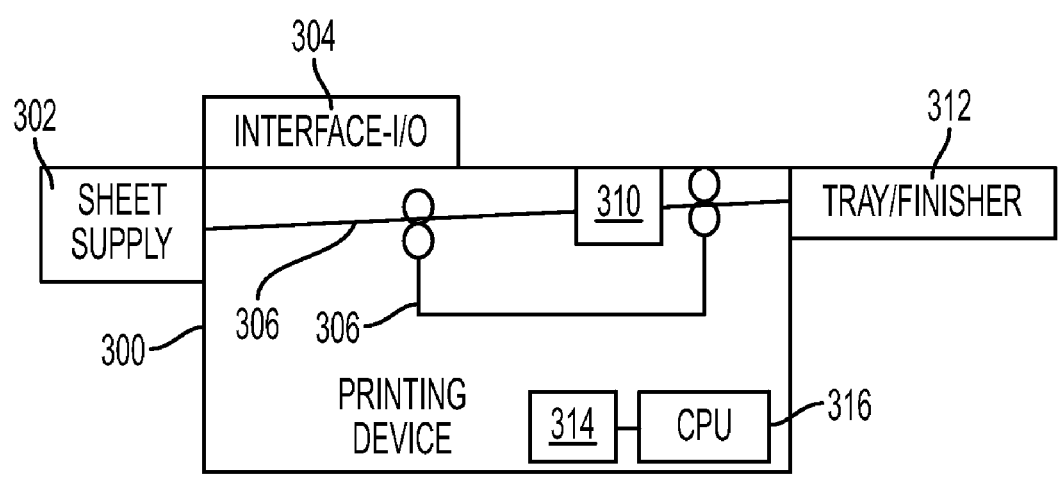
FIG. 6 is a schematic diagram of a printing apparatus according to embodiments herein.

FIGS. 1-6 illustrate exemplary structures of embodiments herein. FIGS. 1 and 2 respectively illustrate top (plan) and side (cross-sectional) views of a pressure roll 200 and vacuum belt 212, FIGS. 3 and 4 illustrates two of the pressure roll segments; and FIGS. 5 and 6 illustrate a printer, copier, or other printing apparatus 300 that includes the pressure roll shown in FIGS. 1-4.

More specifically, FIG. 1 illustrates a pressure roll 200 that includes pressure roll segments 202 that are connected to each other by a common axle 204. Each pressure roll segment 202 contacts the belt 212 (e.g., vacuum or non-vacuum belt). With embodiments herein, the roll segments 202 are offset from one another along the vacuum belt 212. The vacuum belt 212 moves in a first direction (a sheet path direction as indicated by the arrows in FIG. 1) that is parallel to the edge of the vacuum belt 212. The roll segments 202 contact the vacuum belt 212 at different linear locations along the first direction. More specifically, each roll segment 202 contacts the vacuum belt 212 directly below the location where the axle 204 passes through each roll segment 202.

The belt 212 can be formed of any suitable material including any combination of plastic, polymer, rubber, cloth, etc. and is supported by various rollers 216. Note that the belt, sheets, rollers, etc. illustrated in the drawings are not necessarily drawn to scale so as to allow clear illustration of the salient features of the embodiments herein. The details regarding vacuum belts and associated structures are well known to those ordinarily skilled in the art and are discussed in, for example, U.S. Pat. Nos. 5,548,388 and 4,589,651, the complete disclosures of which are incorporated herein by reference.

The roll segments 202 can be formed of any common roller material, including, metals, alloys, polymers, plastics, rubbers (or any combination thereof) and are substantially identical to one another in size and shape. Each of the roll segments 202 comprises a substantially identical center through which the common axle 204 passes. All the centers 214 of the roll segments 202 are positioned the same height distance from the vacuum belt 212 (because the roll segments 202 are substantially identical to each other); however, the centers 214 of the roll segments 202 are offset from one another along the first direction of the vacuum belt 212.

The common axle 204 can comprise any common material, including, metals, alloys, polymers, plastics, rubbers (or any combination thereof) and passes through all the centers 214 of the roll segments 202. Because the roll segments 202 (and the centers 214) are offset along the first direction, the axle is non-perpendicular to the first direction. In other words, the axle is positioned at a non-perpendicular angle (at an angle other that 90°) with respect to the edge of the vacuum belt 212 (and with respect to the first direction).

To accommodate this angled position, the axle 204 can be connected to axle ends 206 through axle joints 224. The axle 204 can be a non-rotating axle or can be rotating. If the axle 204 is non-rotating, the axle joints 224 can comprise simple mechanical connections or bends within any continuous axle. Alternatively, if the axle 204 rotates, the axle joints 224 can comprise any suitable mechanical connection including constant velocity joints, planetary gears, bevel gears, etc.

The connection between the axle 204 and the roll segments 202 can be as simple as a fixed or moving axle 204 passing through a rounded opening 214 (which may or may not be beveled). Alternatively, the connection between the axle 204 and the roll segments 202 can comprise complicated structures including constant velocity joints, planetary gears, bevel gears, bearings, etc. All of these structures and their equivalents are intended to be illustrated by items 226 in the drawings.

In some embodiments, the axle 204 can be connected with gears, or other high-friction joints to allow the axle 204 to drive or rotate the roll segments 202. In these embodiments, the axle ends 206 are connected to a drive motor. In other embodiments, a separate drive yoke 208 (that is connected to a drive motor) and drive wheel 210, 211 can be used to drive or rotate the roll segments 202. In the drawings, drive wheel 211 (FIG. 2) is positioned to contact the outer surface 218 of the roll segments 202 and drive wheel 210 (FIGS. 1 and 5) is positioned to contact the side of the roll segments 202, or an internal lip (or a gear) 238 of the roll segments 202 so as to drive the roll segments 202. Items 208 and 210 can also represent an idler system (which may or may not be driven) that applies an intentional racking force to the segmented rolls 202. The idler system prevents the segmented rolls from rotating parallel to the axle (204) rather than in the direction of the sheet.

In other embodiments, the roll segments 202 can be non-driven and connected to the axle 204 through low-friction (frictionless) connections, and in these embodiments, the roll segments 202 can freely rotate through contact with the moving vacuum belt 212 and/or the moving sheets of media 220. Further, if the roll segments 202 are non-driven, they can rotate freely on the axle 204 independently of one another, or the roll segments 202 can be connected to the axle 204 through gears, high-friction flexible joints, etc. to cause all roll segments 202 to rotate in unison (simultaneous rotation) as the axle 204 freely rotates.

Also, in other embodiments, some of the roll segments 202 can be allowed to rotate freely while other roll segments can be driven by the axle 204 or the drive wheel 210. For example, the drive wheel 210, 211 can be connected to some (less than all) of the roll segments 202 and the remaining roll segments that are not connected to the drive wheel 210, 211 can rotate freely and independently of other roll segments. Similarly, some of the roll segments 202 can be connected to the axle 204 using gears or other high-friction flexible joints so that those roll segments 202 are driven while other roll segments 202 can be connected to the axle 204 through bearings or other similar low-friction (frictionless) connections to allow some of the roll segments 202 to be driven and others to rotate freely. Rotating less than all the roll segments 202 allows a smaller drive motor to be utilized, thereby saving power consumption, weight, complexity, and cost.

As shown in exploded view in FIG. 3, each of the two roll segments 202 comprises a curved, flattened outer contact surface 218 contacting the vacuum belt 212. In addition, the adjacent side surfaces 222 of the roll segments 202 that contact and rub against one another can be formed from, or coated with, a low-friction material (such as poly (tetrafluoroethylene) (PTFE) or other suitable low-friction material). Alternatively, a low-friction washer or spacer 228 can be used to help the roll segments 202 rotate without directly contacting one another. The curved, flattened outer surfaces 218 of the roll segments 202 intersect the curved, flattened outer surfaces 218 of adjacent roll segments 202 at only two points (402, 404) as shown in FIG. 4 because the roll segments 202 are offset from one another.

As shown generally in FIG. 6, the printing apparatus 300 includes a processor 316 within the printing apparatus 300. The apparatus 300 also includes a computer-readable storage medium 314 operatively connected to the processor 316. The computer-readable storage medium 314 stores instructions executable by the processor 316 to allow the processor 316 to control the apparatus 300, including the operation of driving the vacuum belt 212, as well as any drive motors that may be connected to the yoke 208 and/or the axle ends 206.

Further, the apparatus 300 includes at least one interface and/or input/output 304 operatively connected to the processor 316. The input output 304 can comprise a wired or wireless Internet connection, a graphic user interface, a document input tray, a raster image scanner, or any other form of data input/output.

One or more printing engine(s) 310 can be included within the apparatus 300 to print the print job. For example, sheets can be supplied from a sheet supply 302, fed along a paper path 306 to the printing engine(s) 310 to place markings on the sheets. The sheets can then be returned along the paper path 306 for additional printing (multi-color or simplex/duplex). Many portions of the paper path 306 can include the belt 212 and segmented pressure rule 200 that is discussed above. Finally, the sheets are output to some form of user accessible region such as an output tray, sorter, finisher 312, etc.

The media path 306 is operatively connected and controlled by the controller 316. The media path 306 feeds media sheets in a media path direction from a media source 302 (e.g., paper tray) to a destination (e.g., a marking device placing marking on the media sheets 310 or tray/finisher 312).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The embodiments herein specifically applied to electrostatic and xerographic devices. The details of printers, printing engines, etc. are well-known by those ordinarily skilled in the art and are discussed in, for example, U.S. Patent Publication 2008/0061499, the complete disclosure of which is fully incorporated herein by reference.

Figure 7:
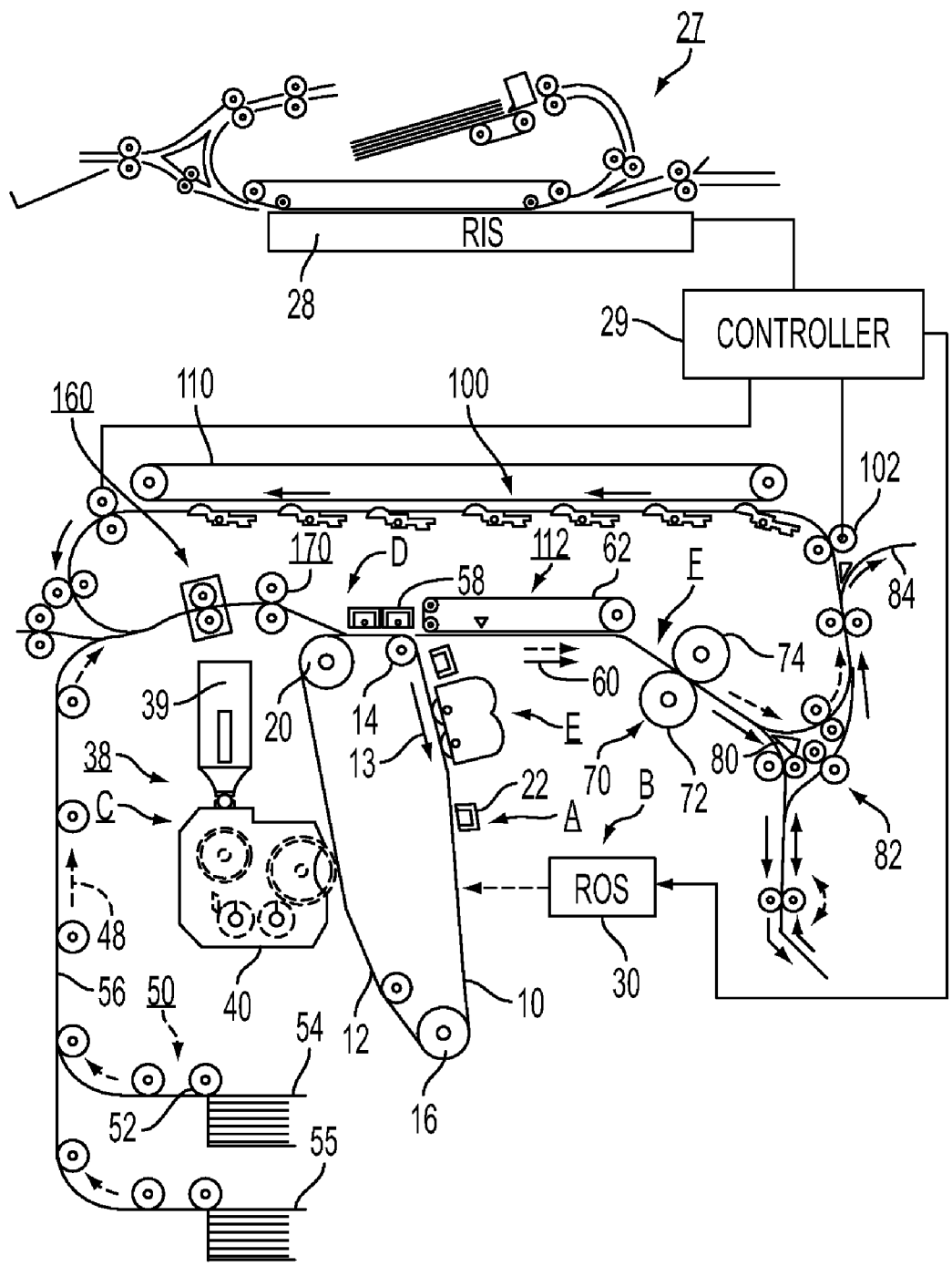
FIG. 7 is a schematic diagram of a printing apparatus according to embodiments herein.

For example, FIG. 7 schematically depicts an electrophotographic printing machine that is similar to one described in U.S. Patent Publication 2008/0061499. It will become evident from the following discussion that the present embodiments may be employed in a wide variety of devices and is not specifically limited in its application to the particular embodiment depicted in FIG. 7.

FIG. 7 schematically depicts an electrophotographic printing machine incorporating the features of the present disclosure therein. It will become evident from the following discussion that the device of the present disclosure may be employed in wide variety of devices and is not specifically limited in its application to the particular embodiments depicted herein. For example, the apparatus of the present disclosure can be used in document handlers, if desired.

FIG. 7 illustrates an original document positioned in a document handler 27 on a raster input scanner (RIS) indicated generally by the reference numeral 28. The document handler 27 can include the vacuum belt 212 and segmented pressure roller 200, as discussed above. The RIS contains document illumination lamps; optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 7 schematically illustrates an electrophotographic printing machine, which generally employs a photoconductive belt 10. Preferably, the photoconductive belt 10 is made from a photoconductive material coated on a grounded layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or grayscale rendition of the image which is transmitted to a modulated output generator, for example, a raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by raster basis.

After the electrostatic latent image has been recorded on photoconductive surface 12, belt 10 advances the latent image to a development station C, where toner, in the form of liquid or dry particles, is electrostatically attracted the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 39, dispenses toner particles into developer housing 40 of developer unit 38.

With continued reference to FIG. 7, after the electrostatic latent image is developed, the toner powder image present on belt 10 advances to transfer station D. A print sheet 48 is advanced to the transfer station D, by a sheet feeding apparatus, 50. Preferably, sheet feeding apparatus 50 includes a feed rolls 52 and 53 contacting the uppermost sheet of stacks 54 and 55, respectively. Feed roll 52 rotates to advance the uppermost sheet from stack 54 into vertical transport 56. Vertical transport 56 directs the advancing sheet 48 of support material into pre-registration device 160 which in conjunction with stalled roll registration mechanism 170 moves a now registered sheet 48 past image transfer station D to receive an image from photoreceptor belt 10 in a timed sequence so that the toner powder image formed thereon contacts the advancing sheet 48 at transfer station D. The vertical transport 56 can comprise a vacuum belt 212 and any of the roller mechanisms, 160, 170, etc. can comprise the segmented pressure roller 200 that is discussed above. Transfer station D includes a corona generating device 58, which sprays ions onto the back side of sheet 48. This attracts the toner powder image from photoconductive surface 12 to sheet 48. After transfer, sheet 48 continues to move in the direction of arrow 60 by way of belt transport 62, which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roll 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the non-transferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor, which controls the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. An apparatus comprising:
    a vacuum belt;
    a common axle adjacent said vacuum belt; and
    a pressure roll contacting said vacuum belt, said pressure roll comprising at least two roll segments connected to said common axle and contacting said vacuum belt, said roll segments being offset from one another along said vacuum belt,
    said roll segments contacting and rubbing against one another.

2. The apparatus according to claim 1, said vacuum belt moving in a first direction along a sheet path direction, said roll segments contacting said vacuum belt at different locations along said first direction.

3. The apparatus according to claim 1, said roll segments being substantially identical to one another.

4. The apparatus according to claim 1, each of said roll segments comprising a center through which said common axle passes, all centers of said roll segments being positioned a same distance from said vacuum belt, and said centers of said roll segments being offset from one another.

5. The apparatus according to claim 1, each of said roll segments comprising a curved, flattened outer surface contacting said vacuum belt, wherein curved, flattened outer surfaces of said roll segments intersect curved, flattened outer surfaces of adjacent roll segments at only two points.

6. An apparatus comprising:
    a vacuum belt having a surface moving in a first direction;
    a common axle adjacent said vacuum belt said common axle being non-perpendicular to said first direction; and
    a pressure roll contacting said surface of said vacuum belt, said pressure roll comprising at least two roll segments connected to said common axle and contacting said surface of said vacuum belt, said roll segments being offset from one another along said first direction of vacuum belt,
    said roll segments contacting and rubbing against one another.

7. The apparatus according to claim 6, said roll segments contacting said vacuum belt at different locations along said first direction.

8. The apparatus according to claim 6, said roll segments being substantially identical to one another.

9. The apparatus according to claim 6, said centers of said roll segments being positioned a same distance from said vacuum belt, and said centers of said roll segments being offset from one another.

10. The apparatus according to claim 6, each of said roll segments comprising a curved, flattened outer surface contacting said surface of said vacuum belt, wherein curved, flattened outer surfaces of said roll segments intersect curved, flattened outer surfaces of adjacent roll segments at only two points.

11. A printing apparatus comprising:
    a printing engine;
    a vacuum belt transporting media sheets relative to said printing engine;
    a common axle adjacent said vacuum belt; and
    a pressure roll contacting said vacuum belt, said pressure roll comprising at least two roll segments connected to said common axle and contacting said vacuum belt, said roll segments being offset from one another along said vacuum belt,
    said roll segments contacting and rubbing against one another.

12. The apparatus according to claim 11, said vacuum belt moving in a first direction along a sheet path direction, said roll segments contacting said vacuum belt at different locations along said first direction.

13. The apparatus according to claim 11, said roll segments being substantially identical to one another.

14. The apparatus according to claim 11, each of said roll segments comprising a center through which said common axle passes, all centers of said roll segments being positioned a same distance from said vacuum belt, and said centers of said roll segments being offset from one another.

15. The apparatus according to claim 11, each of said roll segments comprising a curved, flattened outer surface contacting said vacuum belt, wherein curved, flattened outer surfaces of said roll segments intersect curved, flattened outer surfaces of adjacent roll segments at only two points.

16. A pressure roll used within a printing apparatus, said printing apparatus comprising a vacuum belt transporting media sheets relative to a printing engine, and a common axle adjacent said vacuum belt, said pressure roll contacting said vacuum belt, and said pressure roll comprising:
    at least two roll segments connected to said common axle, said roll segments contacting said vacuum belt, and
    said roll segments being offset from one another along said vacuum belt,
    said roll segments contacting and rubbing against one another.

17. The pressure roll according to claim 16, said vacuum belt moving in a first direction along a sheet path direction, said roll segments contacting said vacuum belt at different locations along said first direction.

18. The pressure roll according to claim 16, said roll segments being substantially identical to one another.

19. The pressure roll according to claim 16, each of said roll segments comprising a center through which said common axle passes, all centers of said roll segments being positioned a same distance from said vacuum belt, and said centers of said roll segments being offset from one another.

20. The pressure roll according to claim 16, each of said roll segments comprising a curved, flattened outer surface contacting said vacuum belt, wherein curved, flattened outer surfaces of said roll segments intersect curved, flattened outer surfaces of adjacent roll segments at only two points.

* * * * *